United States Patent
Srinivasan et al.

(10) Patent No.: US 6,689,862 B2
(45) Date of Patent: Feb. 10, 2004

(54) POLYESTERCARBONATES AND METHODS OF MANUFACTURE

(75) Inventors: Veeraraghavan Srinivasan, Kundalahalli (IN); Rein Mollerus Faber, Bergen op Zoom (NL); Jan Pleun Lens, Breda (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/064,346

(22) Filed: Jul. 3, 2002

(65) Prior Publication Data

US 2004/0010112 A1 Jan. 15, 2004

(51) Int. Cl.⁷ .............................................. C08G 64/00
(52) U.S. Cl. ........................ 528/198; 528/196; 528/271; 528/272
(58) Field of Search .................. 528/196, 198, 528/271, 272

(56) References Cited

U.S. PATENT DOCUMENTS

| | | | |
|---|---|---|---|
| 4,217,438 A | | 8/1980 | Brunelle et al. |
| 5,480,959 A | | 1/1996 | Schmidhauser |
| 6,204,313 B1 | * | 3/2001 | Bastiaens et al. ........... 524/100 |
| 6,538,065 B1 | * | 3/2003 | Suriano et al. ............. 525/182 |
| 2002/0035234 A1 | * | 3/2002 | Silva et al. ................ 528/198 |

* cited by examiner

*Primary Examiner*—Terressa M. Boykin

(57) ABSTRACT

Polyestercarbonates are disclosed which comprise structural units derived from at least one bisphenol derived from terpene precursors, at least one aromatic dihydroxy compound comonomer, at least one diester derived from a $C_1$–$C_{40}$ linear or branched divalent hydrocarbyl radical, and at least one carbonic acid diester. Also disclosed are methods to make the polyestercarbonates and articles derived therefrom.

39 Claims, No Drawings

POLYESTERCARBONATES AND METHODS OF MANUFACTURE

BACKGROUND

The disclosure relates to polyestercarbonates and more particularly, to polyestercarbonates based on bisphenols derived from cyclic monoterpene precursors as one of the building blocks. The disclosure also relates to melt transesterification polymerization methods for making the polyestercarbonates and to methods for making such articles from the polyestercarbonates.

Polycarbonate homopolymers are widely used in a variety of applications by virtue of their excellent physical properties, such as impact resistance, mechanical characteristics, transparency, and the like. Bisphenol A (BPA) polycarbonate, the industry benchmark material, by virtue of its low cost, good transparency, and mechanical properties has served as the substrate of choice for optical data storage media such as compact disk and digital versatile disk (DVD). However, the need to store greater amounts of information on individual disks has resulted in newer techniques for high-density data storage, based on multiple information layers and shorter wavelength lasers, such as high density DVD (HDDVD), digital video recordable (DVR), DVD-recordable (DVD–R and DVD+R), and DVD-rewritable (DVD–RW and DVD+RW) formats. The transparent plastic layer that forms the non-interfering shielding on such optical media disks requires more demanding material specifications, such as high transparency, heat resistance, low water absorption, ductility and fewer particulates that standard BPA homopolycarbonate cannot meet. Therefore, polyestercarbonates have been studied for their utility as a more effective material for optical media applications, such as data storage and retrieval.

One of the critical properties that influence the efficacy of a given material for higher data storage density is the spacing between the pits and grooves on the substrate material. Since data is stored in these pits and grooves, the flatness of the disk is necessary to prevent loss of information. It is known that excessive moisture absorption by the disk results in skewing of the disk or the films that form the disk, which in turn leads to reduced reliability. This skewing, hereinafter referred to as dimensional stability, will result in data being stored or read inaccurately by the laser beam. Since the bulk of the disk is generally comprised of polymer material, the flatness of the disk depends on the low water absorption of the polymeric material. For example, a film produced from conventional BPA polycarbonate often exhibits warp due to absorption of ambient moisture. The dimensional stability is a function of, among other factors, the amount of ambient moisture present as well as the rate of moisture absorption. In addition to possessing optimum dimensional stability, a satisfactory material for such advanced format optical disks should also exhibit optimum replication and cycle time vis-à-vis the conditions for manufacturing conventional optical disks, such as compact disks. In order to produce high quality disks through injection molding, the polymer should also be easily processible, that is, exhibit good flow. Therefore there is a continued need for developing new materials as suitable substrates that would serve these advanced data storage formats. Suitable materials for high-density storage formats should satisfactorily address the critical requirement of dimensional stability, in addition to replication and cycle time, without compromising on any of the other desirable characteristics that BPA homopolycarbonate already possesses.

BRIEF SUMMARY

A polyestercarbonate comprising structural units derived from at least one bisphenol of the formulas:

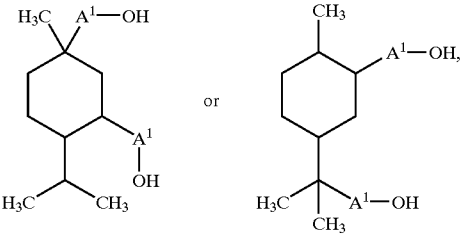

wherein each $A^1$ is independently a divalent substituted or unsubstituted aromatic radical; at least one aromatic dihydroxy compound of the formula:

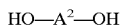

HO—$A^2$—OH wherein $A^2$ is selected from divalent substituted and unsubstituted aromatic radicals; at least one dicarboxylic acid diester of the formula:

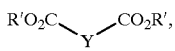

wherein Y is a $C_1$–$C_{40}$ linear or branched divalent hydrocarbyl radical, and R' is a $C_7$–$C_{12}$ aryl or alkaryl radical; and at least one carbonic acid diester of the formula $(ZO)_2C=O$, wherein each Z is independently an unsubstituted or substituted alkyl radical, or an unsubstituted or substituted aryl radical.

In another embodiment, the polyestercarbonate comprises structural units derived from at least one bisphenol of the formulas:

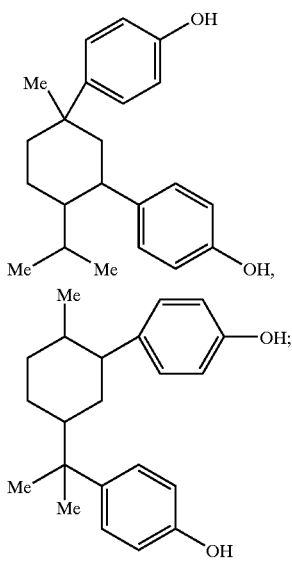

at least one aromatic dihydroxy compound comonomer selected from the group consisting of resorcinol, bisphenol A, 4,4'-(1-decylidene)-bisphenol, 2,2-bis(3-sec-butyl-4-hydroxyphenyl)propane and mixtures thereof; at least one dicarboxylic acid diester of the formula

wherein Y is a linear divalent hydrocarbyl group of the formula $(CH_2)_n$, wherein n has values in the range from about 4 to about 18, and R' is phenyl; and diphenyl carbonate, wherein the polyestercarbonate has a glass transition temperature of at least about 100° C.; a weight average molecular weight of at least about 5,000; and a dimensional stability as measured by percentage elongation of less than about 0.05% relative to its initial length following exposure to air with a relative humidity of about 100%, at a temperature of about 23° C., and for a duration of about 3 hours.

A melt transesterification polymerization method for producing a polyestercarbonate is disclosed herein. The method comprises combining a catalyst and a reactant composition to form a reaction mixture; and mixing the reaction mixture under reactive conditions for a time period to produce a polyestercarbonate product, wherein the reactant composition comprises a carbonic acid diester of the formula $(ZO)_2C=O$, where each Z is independently an unsubstituted or substituted alkyl radical, or an unsubstituted or substituted aryl radical; at least one bisphenol of the formula:

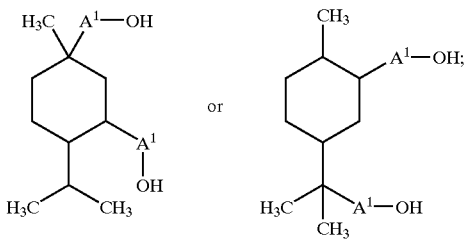

wherein each $A^1$ is independently a substituted or unsubstituted divalent aromatic radical; at least one aromatic dihydroxy compound comonomer selected from the group consisting of

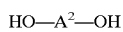

$$HO-A^2-OH$$

wherein $A^2$ is selected from divalent substituted or unsubstituted aromatic radicals; and at least one dicarboxylic acid diester selected from the group consisting of

wherein Y is a $C_1$–$C_{40}$ linear or branched divalent hydrocarbyl radical, and R' is a $C_7$–$C_{12}$ aryl or alkaryl radical.

In another embodiment, the method for producing a polyestercarbonate by a melt transesterification polymerization method comprises combining a catalyst comprising at least one of sodium hydroxide or tetramethylammonium hydroxide, and a reactant composition to form a reaction mixture; and mixing the reaction mixture under reactive conditions for a time period to produce a polyestercarbonate product, wherein the reactant composition comprises a diphenyl carbonate; at least one bisphenol of the formulas:

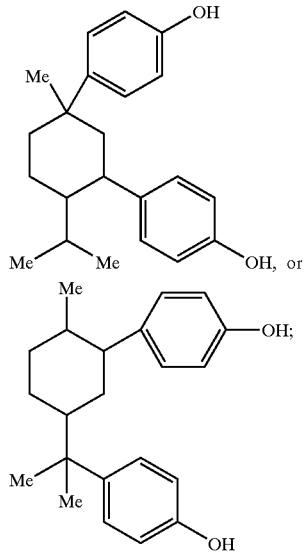

at least one aromatic dihydroxy compound comonomer selected from the group consisting of resorcinol, bisphenol A, 4,4'-(1-decylidene)-bisphenol, 2,2-bis(3-sec-butyl-4-hydroxyphenyl)propane and mixtures thereof; and at least one dicarboxylic acid diester selected from the group consisting of

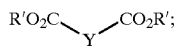

wherein Y is a linear divalent hydrocarbyl group of the formula $(CH_2)_n$, wherein n has values in the range from about 4 to about 18, and R' is phenyl.

The embodiments of the present disclosure have many advantages, including the ability to manufacture the above mentioned polyestercarbonates in a cost effective, environmentally acceptable manner, and for fabricating articles and films suitable for high heat, and optical data storage/retrieval applications.

DETAILED DESCRIPTION

Disclosed herein are polyestercarbonates that are suitable for high density storage formats. The polyestercarbonates are preferably formed by melt transesterification (i.e., a melt method) of bisphenol compound, an aromatic dihydroxy compound comonomer, a dicarboxylic acid compound, and a carbonic acid diester compound.

Preferably, the bisphenol compounds are derived from cyclic monoterpene precursors, and more preferably comprise those having formulas (I) or (II):

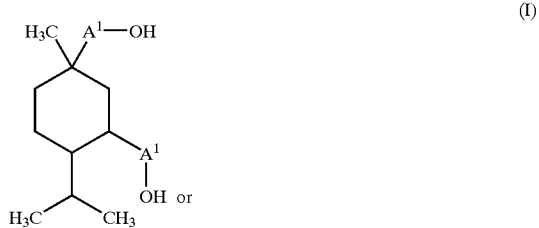

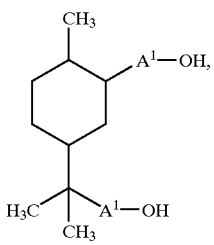

(II)

wherein $A^1$ is a substituted or unsubstituted divalent aromatic radical.

In one embodiment, the bisphenols derived from cyclic monoterpene precursors comprise bis(hydroxyaryl) cyclohexanes such as structures (III) and (IV) as shown below:

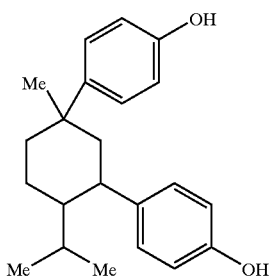

(III)

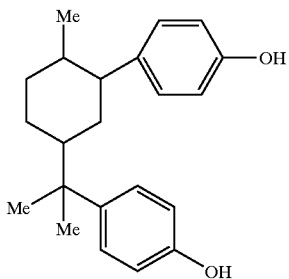

(IV)

The above bisphenols can be readily prepared using procedures described, for example, in U.S. Pat. No. 5,480,959.

Aromatic dihydroxy compound comonomers that can be employed in the disclosure comprise those of the general formula (V):

HO—$A^2$—OH,     (V)

wherein $A^2$ is a divalent aromatic radical.

In some embodiments, $A^2$ has the structure of formula (VI):

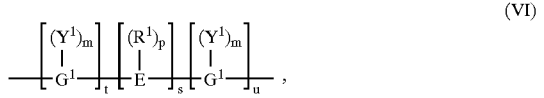

(VI)

wherein $G^1$ represents an aromatic group, such as phenylene, biphenylene, naphthylene, etc. E may be an alkylene or alkylidene group such as methylene, ethylene, ethylidene, propylene, propylidene, isopropylidene, butylene, butylidene, isobutylidene, amylene, amylidene, isoamylidene, etc. and may consist of two or more alkylene or alkylidene groups connected by a moiety different from alkylene or alkylidene, such as an aromatic linkage; a tertiary amino linkage; an ether linkage; a carbonyl linkage; a silicon-containing linkage; or a sulfur-containing linkage such as sulfide, sulfoxide, sulfone, etc.; or a phosphorus-containing linkage such as phosphinyl, phosphonyl, etc. In addition, E may be a cycloaliphatic group. $R^1$ represents hydrogen or a monovalent hydrocarbon group such as alkyl, aryl, aralkyl, alkaryl, or cycloalkyl. $Y^1$ may be an inorganic atom such as halogen (fluorine, bromine, chlorine, iodine); an inorganic group such as nitro; an organic group such as alkenyl, allyl, or $R^1$ above, or an oxy group such as OR; it being only necessary that $Y^1$ be inert to and unaffected by the reactants and reaction conditions used to prepare the polymer. The letter m represents any integer from and including zero through the number of positions on $G^1$ available for substitution; p represents an integer from and including zero through the number of positions on E available for substitution; "t" represents an integer equal to at least one; "s" is either zero or one; and "u" represents any integer including zero.

Suitable examples of E include cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, etc.); a sulfur-containing linkage, such as sulfide, sulfoxide or sulfone; a phosphorus-containing linkage, such as phosphinyl, phosphonyl; an ether linkage; a carbonyl group; a tertiary nitrogen group; or a silicon-containing linkage such as silane or siloxy.

In the aromatic dihydroxy comonomer compound (V) in which $A^2$ is represented by formula (VI) above, when more than one $Y^1$ substituent is present, they may be the same or different. The same holds true for the $R^1$ substituent. Where s is zero in formula (VI) and u is not zero, the aromatic rings are directly joined with no intervening alkylidene or other bridge. The positions of the hydroxyl groups and $Y^1$ on the aromatic nuclear residues $G^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments, the parameters "t", "s", and "u" are each one; both $G^1$ radicals are unsubstituted phenylene radicals; and E is an alkylidene group such as isopropylidene. In particular embodiments, both $G_1$ radicals are p-phenylene, although both may be o- or m-phenylene or one o- or m-phenylene and the other p-phenylene.

Some illustrative, non-limiting examples of aromatic dihydroxy comonomer compounds of formula (V) include the dihydroxy-substituted aromatic hydrocarbons disclosed by name or formula (generic or specific) in U.S. Pat. No. 4,217,438. Some particular examples of aromatic dihydroxy compound comonomers include 4,4'-(3,3,5-trimethylcyclohexylidene)diphenol; 4,4'-bis(3,5-dimethyl) diphenol, 1,1-bis(4-hydroxy-3-methylphenyl)cyclohexane; 4,4-bis(4-hydroxyphenyl)heptane; 2,4-dihydroxydiphenylmethane; bis(2-hydroxyphenyl)methane; bis(4-hydroxyphenyl) methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (commonly known as bisphenol A); 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl) propane; 2,2-bis(4-hydroxy-3,5-dimethylphenyl) propane; 2,2-bis(3,5,3',5'-tetrachloro-4,4'-dihydroxyphenyl)propane;

bis(4-hydroxyphenyl)cyclohexylmethane; 2,2-bis(4-hydroxyphenyl)-1-phenylpropane; 2,4'-dihydroxyphenyl sulfone; 2,6-dihydroxy naphthalene; hydroquinone; resorcinol; and $C_{1-3}$ alkyl-substituted resorcinols.

Suitable aromatic dihydroxy comonomer compounds also include those containing indane structural units such as those represented below by formulas (VII) and (VIII) as shown below. Formula (VII) represents 3-(4-hydroxyphenyl)-1,1,3-trimethylindan-5-ol, and formula (VIII) represents 1-(4-hydroxyphenyl)-1,3,3-trimethylindan-5-ol.

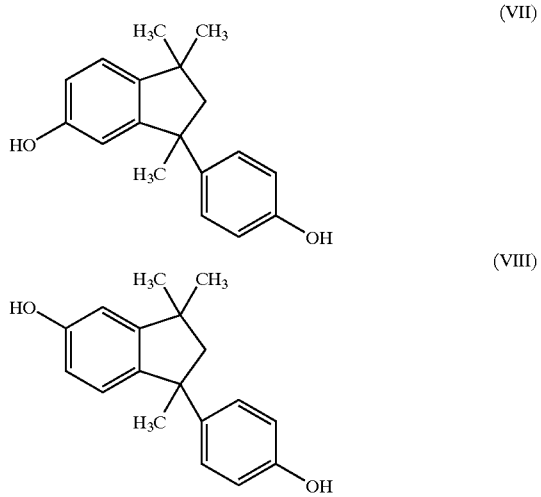

Also included among suitable aromatic dihydroxy compound comonomers are the 2,2,2',2'-tetrahydro-1,1'-spirodiols having formula (IX) as follows:

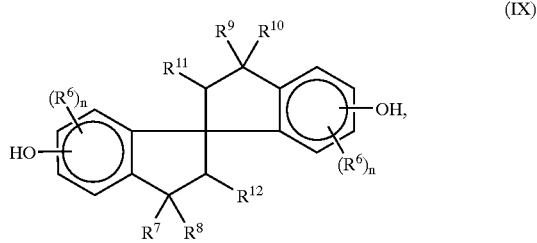

wherein each $R^6$ is independently selected from monovalent hydrocarbon radicals halogen radicals; wherein each $R^7$, $R^8$, $R^9$, and $R^{10}$ is independently $C_{1-6}$ alkyl; wherein each $R^{11}$ and $R^{12}$ is independently H or $C_{1-2}$ alkyl; and wherein each n is independently selected from positive integers having a value of from 0 to 3 inclusive. In a particular embodiment, the 2,2,2',2'-tetrahydro-1,1'-spiro-diol is 2,2,2',2'-tetrahydro-3,3,3',3'-tetramethyl-1,1'-spirobi[1H-indene]-6,6'-diol (sometimes known as "SBI").

The term "alkyl" as used in the various embodiments of the present disclosure is intended to designate straight chain alkyl, branched alkyl, aralkyl, cycloalkyl, and bicycloalkyl radicals. In various embodiments, straight chain and branched alkyl radicals, unless otherwise specified are those containing from 1 to about 40 carbon atoms, and include as illustrative non-limiting examples methyl, ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments, cycloalkyl radicals represented are those containing from 3 to about 12 ring carbon atoms. Some illustrative non-limiting examples of these cycloalkyl radicals include cyclobutyl, cyclopentyl, cyclohexyl, methylcyclohexyl, and cycloheptyl. In various embodiments, aralkyl radicals are those containing from 7 to 14 carbon atoms; these include, but are not limited to, benzyl, phenylbutyl, phenylpropyl, and phenylethyl. In various embodiments, aromatic radicals used in the present disclosure are intended to designate monocyclic or polycyclic moieties containing from 6 to about 12 ring carbon atoms. These aryl groups may also contain one or more halogen atoms or alkyl groups substituted on the ring carbons. In most embodiments, any substituent present is not in a ring position that would prevent an appropriate aromatic radical, such as in a phenolic aromatic radical, from reacting with an appropriate olefinic group, such as in a monoterpene. Some illustrative non-limiting examples of these aromatic radicals include phenyl, halophenyl, biphenyl, and naphthyl. In another embodiment, aromatic radicals used in the present disclosure are intended to designate aralkyl radicals containing from 7 to 14 carbon atoms.

The polyestercarbonates also comprise structural units derived from at least one dicarboxylic acid diester of the general formula (X)

wherein Y is a $C_1$–$C_{40}$ linear or branched divalent hydrocarbyl radical, and R' is a $C_1$–$C_{12}$ aryl or alkaryl radical.

The structural units derived from dicarboxylic acid diester moieties may be unsubstituted or substituted. The substituents if present, are in some embodiments, $C_{1-12}$ alkyl groups. In one embodiment, a suitable alkyl group is methyl. Suitable halogen substituents comprise bromo, chloro, and fluoro. Dicarboxylic acid diester moieties containing a mixture of alkyl and halogen substituents are also suitable. In other embodiments, dicarboxylic acid diesters comprise alkylene dicarboxylic acid diesters, and in a particular embodiment, alkylene dicarboxylic acid diaryl esters, wherein alkylene groups comprise, in various embodiments, $C_{3-20}$ straight chain alkylene, $C_{3-20}$ branched alkylene, or $C_{4-20}$ cyclo- or bicycloalkylene group. In a particular embodiment, the dicarboxylic acid diester is diphenyl dodecanedioate. In other particular embodiments, dicarboxylic acid diester comprises diphenyl decanedioate, diphenyl tetradecanedioate, diphenyl hexadecanedioate, diphenyl octadecanedioate, and combinations comprising at least one of the foregoing dicarboxylic acid diester moieties in amounts to provide proportions of structural units as described hereinabove.

In various embodiments, diaryl esters comprise diphenyl esters and are derived from phenol. In other embodiments, diaryl esters comprise those derived from monohydroxy aromatic compounds comprising at least one electron withdrawing group ortho, meta, or para to the oxygen substituent of the monohydroxy moiety. In another embodiment, diaryl esters comprise those derived from monohydroxy aromatic compounds comprising at least one electron-withdrawing group ortho or para to the oxygen substituent of the monohydroxy moiety. In another embodiment, diaryl esters comprise those derived from monohydroxy aromatic compounds comprising at least one electron-withdrawing group ortho or para to the oxygen substituent of the monohydroxy moiety selected from the group consisting of o-carboalkoxy, o-carboaryloxy, carboaryl, halo, cyano, and nitro, and mixtures thereof. In another embodiment, diaryl esters comprise those derived from monohydroxy aromatic compounds selected from the group consisting of o-carbomethoxyphenol, o-carbomethoxymethylphenol, o-carboethoxyphenol, o-carbopropoxyphenol, o-chlorophenol, o-carbophenylphenol, o-carbophenoxyphenol, o-carbobenzoxyphenol, and o-nitrophenol.

In another embodiment, the dicarboxylic acid diester also comprises one or a combination of two or more dicarboxylic acid and dicarboxylic acid monoester of the formula (XI):

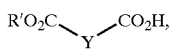
(XI)

wherein Y is a $C_1$–$C_{40}$ linear or branched divalent hydrocarbyl radical, and R' is hydrogen, $C_7$–$C_{12}$ aryl or alkaryl radical. The dicarboxylic acids or the dicarboxylic acid monoesters are present in an amount ranging from about 0 to about 50 mole percent in one embodiment, and in an amount ranging from about 0 to about 30 mole percent in another embodiment, relative to the amount of the dicarboxylic acid diester. When such dicarboxylic acids and/or the dicarboxylic acid monoester are used, more carbonic acid diester is required to convert the carboxylic acid group into the ester group. Examples of the dicarboxylic acids and dicarboxylic acid monoesters include: sebacic acid, monophenyl sebacate, dodecanedioic acid, and monophenyl dodecanedioate, etc.

In other embodiments, the polyestercarbonates described herein have a weight average molecular weight of at least about 5,000, a glass transition temperature of at least about 100° C., and a dimensional stability in films comprising said polyestercarbonate, as measured by percentage elongation of less than about 0.05% relative to its initial length following exposure to nitrogen with a relative humidity of about 100 at a temperature of about 23° C. and for a duration of about 3 hours.

In some embodiments of the disclosure, the polyestercarbonates comprise at least one carbonate structural unit selected from the group consisting of formulas (XII) and (XIII):

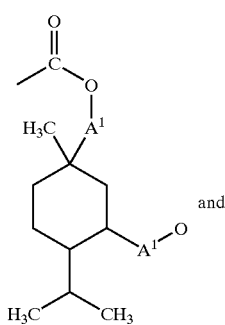
(XII)

and

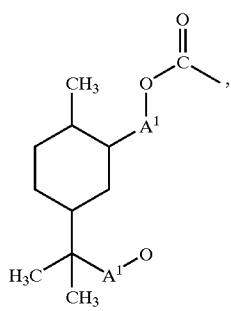
(XIII)

wherein $A^1$ is a substituted or unsubstituted divalent aromatic radical.

In other embodiments, the polyestercarbonates comprise at least one carbonate structural unit selected from the group shown in formula (XIV):

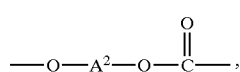
(XIV)

wherein $A^2$ is a divalent aromatic radical.

In other embodiments, the polyestercarbonates comprise at least one structural unit selected from the group shown in formula (XV):

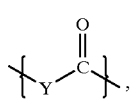
(XV)

wherein Y is independently a $C_1$–$C_{40}$ linear or branched divalent hydrocarbyl radical.

Various embodiments of the disclosure also comprise at least one carbonic acid diester of formula (XVI):

$(ZO)_2C=O,$ (XVI)

wherein each Z is independently an unsubstituted or substituted alkyl radical, or an unsubstituted or substituted aryl radical. Substituents on Z, when present, may include, but are not limited to, one or more of alkyl, halogen, chloro, bromo, fluoro, nitro, alkoxy, alkoxycarbonyl, methoxycarbonyl, ethoxycarbonyl, and cyano. Some particular examples of the carbonic acid diester that can be used in the present disclosure include diaryl carbonates, dialkyl carbonates and mixed aryl-alkyl carbonates such as diphenyl carbonate, bis(2,4-dichlorophenyl) carbonate, bis(2,4,5-trichlorophenyl) carbonate, bis(2-cyanophenyl) carbonate, bis(o-nitrophenyl) carbonate, (o-carbomethoxyphenyl) carbonate; (o-carboethoxyphenyl)carbonate, ditolyl carbonate, m-cresyl carbonate, dinaphthyl carbonate, bis(diphenyl) carbonate, diethyl carbonate, dimethyl carbonate, dibutyl carbonate and dicyclohexyl carbonate, and combinations of two or more thereof. Of these, diphenyl carbonate is often used in particular embodiments. In some embodiments, if two or more of these compounds are utilized, one is diphenyl carbonate.

A method for producing the polyestercarbonate by a melt transesterification polymerization includes combining a catalyst and a reactant composition to form a reaction mixture; and mixing the reaction mixture under reactive conditions for a time period to produce a polyestercarbonate product. The reactant composition comprises the carbonic acid diester of formula (XV) (ZO)$_2$C=O, wherein each Z is independently an unsubstituted or substituted alkyl radical, or an unsubstituted or substituted aryl radical; at least one bisphenol of the formulas (I) or (II):

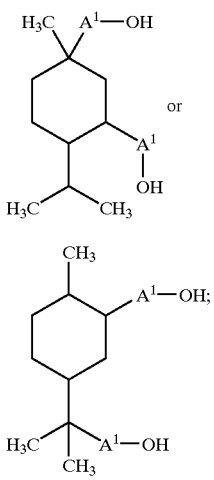

(I)

(II)

wherein each $A^1$ is independently a substituted or unsubstituted divalent aromatic radical; at least one aromatic dihydroxy compound comonomer selected from the group consisting of formula (V)

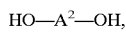

(V)

wherein $A^2$ is selected from divalent substituted or unsubstituted aromatic radicals; and at least one dicarboxylic acid diester selected from the group consisting of formula (X)

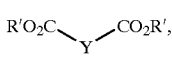

(X)

wherein Y is a C$_1$–C$_{40}$ linear or branched divalent hydrocarbyl radical, and R' is a C$_7$–C$_{12}$ aryl or alkaryl radical.

In particular embodiments of the method, the bisphenol comprises at least one bis (hydroxyaryl)cyclohexane of formulas (III) or (IV) or combinations comprising at least one of the foregoing bisphenols.

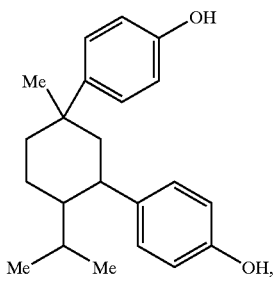

(III)

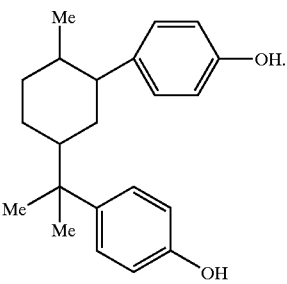

(IV)

In the preparation of the polyestercarbonates, the aromatic dihydroxy compound comonomers described above may be used alone, or as mixtures of two or more different aromatic dihydroxy compound comonomers. In one particular embodiment, suitable aromatic dihydroxy compound comonomers for the preparation of a polyestercarbonate are 2,2-bis(4-hydroxyphenyl)propane (commonly known as bisphenol A or "BPA"), resorcinol, 4,4'-(1-decylidene)-bisphenol (sometimes referred to hereinafter as "bispded") and 2,2-bis(3-sec-butyl-4-hydroxyphenyl)propane (sometimes referred to hereinafter as "s-BPA"), or combinations comprising at least one of the foregoing aromatic dihydroxy compounds.

In some embodiments, the polyestercarbonates are prepared using at least one dicarboxylic acid diester selected from the group consisting of formula (X)

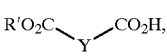

(X)

wherein Y is a linear alkylidene group having the formula (CH$_2$)$_n$, wherein n has values of about 4 to about 18, and R' is a phenyl radical. In a particular embodiment, n has the value of about 12, and R' is a phenyl radical.

Alternatively, the dicarboxylic acid diester comprises one or a combination of two or more dicarboxylic acid and dicarboxylic acid monoester of the formula (XI):

R'O$_2$C―Y―CO$_2$H, (XI)

wherein Y is a C$_1$–C$_{40}$ linear or branched divalent hydrocarbyl radical, and R' is hydrogen, C$_7$–C$_{12}$ aryl or alkaryl radical.

During the manufacture of the polyestercarbonates by the melt transesterification method, the amount of the above types of carbonic acid diesters and the dicarboxylic acid diesters are in some embodiments, in an amount of 0.95 to 1.30 moles, and in other embodiments, in an amount of 1.05 to 1.1 5 moles, based on one mole of the bisphenol and aromatic dihydroxy comonomer compounds described above.

Catalysts that can be used for the melt transesterification polymerization include all those known to be effective for such polymerization. In various embodiments such catalysts are selected from the group consisting of alkali metal compounds, alkaline earth metal compounds, tetraorganoammonium compounds, and tetraorganophosphonium compounds, combinations comprising at least one of the foregoing catalysts.

Specific examples of alkali metal compounds or alkaline earth metal compounds include organic acid salts, inorganic acid salts, oxides, hydroxides, hydrides, and alcoholates of alkali metals and alkaline earth metals. In some embodiments, the catalyst is an alkali metal compound of the formula $M_1 X_1$, wherein $M_1$ is selected from the group consisting of lithium, sodium, and potassium; and $X_1$ is selected from the group consisting of hydroxide and OAr, wherein Ar is a monovalent aromatic radical.

More specifically, examples of alkali metal compounds include, but are not limited to, sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, lithium stearate, sodium stearate, potassium stearate, lithium hydroxyborate, sodium hydroxyborate, sodium phenoxyborate, sodium benzoate, potassium benzoate, lithium benzoate, disodium hydrogen phosphate, dipotassium hydrogen phosphate, dilithium hydrogen phosphate, disodium salts, dipotassium salts, and dilithium salts of bisphenol A, and sodium salts, potassium salts, and lithium salts of phenol, etc.

Furthermore, specific examples of alkaline earth metal compounds include, but are not limited to, calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, and strontium stearate, etc.

In other embodiments, the catalyst is a tetraorganoammonium compound of the formula $R_4\ NY^2$, wherein R is a $C_1$–$C_4$ alkyl group, and $Y^2$ is hydroxide, acetate, or OAr, wherein Ar is a monovalent aromatic radical. In still other embodiments, the catalyst is a tetraorganophosphonium compound of the formula $R_4\ PY^2$, wherein R is a $C_1$–$C_4$ alkyl group, and $Y^2$ is hydroxide, acetate, or OAr, wherein Ar is a monovalent aromatic radical.

Specific examples of tetraorganoammonium compounds and tetraorganophosphonium compounds include, but are not limited to tetramethylammonium hydroxide, tetrabutylammonium hydroxide, tetraethylphosphonium hydroxide, tetrabutylphosphonium acetate, tetrabutylphosphonium hydroxide and the like.

Any of the catalysts disclosed above may be used as combinations of 2 or more substances. The catalyst may be added in a variety of forms. The catalyst may be added as a solid, for example as a powder, or it may be dissolved in a solvent, for example, in water or alcohol.

In the present disclosure, the total catalyst composition is in one embodiment, in the amount of from about $1 \times 10^{-7}$ to about $2 \times 10^{-3}$ moles, and in another embodiment, from about $1 \times 10^{-6}$ to about $4 \times 10^{-4}$ moles for each mole of the combination of the bisphenol aromatic dihydroxy compound comonomer and the dicarboxylic acid diester.

The term melt polymerization is generally meant to refer to the polymerization process whereby the bisphenols, e.g., formulas (I) or (II) as shown below,

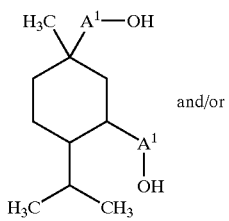

(I)

and/or

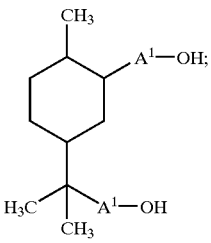

(II)

aromatic dihydroxy compound comonomers of formula (V), dicarboxylic acid diesters of formula (X), and carbonic acid diesters of formula (XVI) condense in the presence of a suitable catalyst as described above. Melt polymerization can be accomplished in a process involving one or more stages. The one stage process comprises manufacturing polycarbonates by melt polycondensation of the above bis (hydroxyaryl) cyclohexanes, aromatic dihydroxy compound comonomers (III), dicarboxylic acid diesters, and carbonic acid diesters in the presence of the catalysts described above. The reactor employed for carrying out these polymerizations is not particularly in some embodiments, it can be made either of glass or a metal. In some embodiments, the reactor walls may be passivated by treatment with a suitable acidic material. If it is desirable to carry out the polymerization in a glass reactor, soaking it in an aqueous acid medium passivates the walls of the reactor. In various embodiments, the acids for this passivation process include water solutions of mineral acids, such as hydrochloric acid, sulfuric acid, nitric acid, and the like, and organic acids, such as acetic acid, methanesulfonic acid, toluenesulfonic acid, and the like.

In various embodiments, the reactants for the polymerization reaction can be charged into a reactor either in the solid form or in the molten form. Initial charging of reactants into a reactor and subsequent mixing of these materials under reactive conditions for the polymerization may be conducted in an inert gas atmosphere such as a nitrogen atmosphere. Mixing of the reaction mixture is accomplished by methods known in the art, such as by stirring. Reactive conditions in the present context refer to conditions comprising time, temperature, pressure and other factors that result in polymerization of the reactants.

In various embodiments, the polymerization is conducted by subjecting the above reaction mixture to a series of temperature-pressure-time protocols. In some embodiments, this involves gradually raising the reaction temperature in stages while gradually lowering the pressure in stages. Thus in various embodiments of this process, the pressure is varied from about atmospheric pressure at the start of the reaction to a value in a range of, in one embodiment, between about atmospheric pressure and about 0.01 millibar pressure; in another embodiment, between about atmospheric pressure and about 0.05 millibar pressure; and in another embodiment, between about 300 millibars pressure and about 0.05 millibar pressure. In various embodiments, the temperature is varied in the range between about the melting temperature of the reaction mixture and about 350° C., between about 180° C. and about 230° C., between about 230° C. and about 270° C., and between about 270° C. and about 350° C. This procedure will generally ensure that the reactants react properly to give polyestercarbonates with the desired molecular weight, glass transition temperature and physical properties. The reaction proceeds to build the polymer chain with production of phenol by-product. Efficient removal of the phenol by-product by application of vacuum produces polyestercarbonates of high molecular weight. If phenol is not removed efficiently, it may participate in the backward reaction whereby the polymer chain is cleaved by phenol in the presence of the polymerization catalyst, thus leading to polymer of lower molecular weight with inferior mechanical and other physical properties. In various embodiments, the progress of the reaction may be monitored by measuring the melt viscosity or the weight average molecular weight of the reaction mixture. After the desired melt viscosity and/or molecular weight is reached, the final polyestercarbonate product may be isolated from the reactor in a solid or molten form.

The method of producing polyestercarbonates of the present disclosure is not limited to what is described hereinabove. Thus the process can be operated either in a batch, semi-batch, or a continuous mode. Reaction apparatus known in the art may be used in conducting this reaction, and in some embodiments, may be a horizontal type, tube type, or column type.

Polyestercarbonates prepared in the manner described above have a weight average molecular weight of at least about 5,000, a glass transition temperature of at least about 100° C., and a dimensional stability in films comprising said polyestercarbonate, as measured by percentage elongation of less than about 0.05% relative to its initial length following exposure to nitrogen with a relative humidity of about 100%, at a temperature of about 23° C., and for a duration of about 3 hours.

Dimensional stability of polyestercarbonates may be measured by placing a polyestercarbonate film in a controlled chamber and exposing it to a stream of nitrogen maintained at a pre-determined level of humidity and temperature for a specified length of time. The absorption of moisture by the polyestercarbonate sample will cause the film to swell or elongate. The film is then de-swelled by driving the absorbed moisture out using de-humidified heated nitrogen, and, the process is generally repeated to arrive at the percent elongation. In one aspect of this method, the process described above can be repeated more than once, and in some embodiments, three times to arrive at the percent elongation. A low percent elongation is indicative of an outstanding resistance to moisture absorption, which translates to excellent dimensional stability.

Polyestercarbonate films cast from polymer produced by the method of the present disclosure exhibit outstanding dimensional stability in a humid environment, as evidenced by the very low percent elongation of less than about 0.05% of the original length of the film. These materials exhibit much better dimensional stability compared to films made from a reference material, BPA homopolycarbonate and the comparative materials, a polycarbonate copolymer prepared from an interfacial reaction of a 45:55 mole ratio of the monomers, 1,1-bis(4-hydroxyphenyl)-3,3,5-trimethylcyclohexane and 4,4'-(m-phenylenediisopropylidene) diphenol, respectively, with phosgene, and a homopolycarbonate derived from reaction of dimethylbisphenol cyclohexanone (DMBPC) with diphenyl carbonate.

The polyestercarbonates and the melt transesterification polymerization method for producing these polyestercarbonates, are useful for producing articles suitable for optical media applications. Preparation of such polycarbonates may be done by selection of catalyst, process conditions, and the proper proportion of the bisphenols, aromatic dihydroxy compound comonomers and dicarboxylic acid diesters. Choosing these parameters is within the ability of one skilled in the art with only minimal experimentation.

In various embodiments, the polyestercarbonates for making articles suitable for optical media applications comprise those in which the bisphenol is at least one bis(hydroxyaryl) cyclohexane described herein, the aromatic dihydroxy compound comonomer is at least one of BPA, resorcinol, bispded, and s-BPA, and the dicarboxylic acid diester is at least one selected from the group as shown in formula (X)

(X)

wherein Y is a linear alkylidene group having the formula $(CH_2)$, where n has values in the range from about 4 to about 18, and R' is phenyl.

The polyestercarbonates compositions and the methods described above to prepare them are used to make optical articles and films for display devices. Optical articles that can be prepared using the polyestercarbonates comprise a film, an optical data storage medium, a rewritable optical disk, and a substrate for an optical data storage medium. The optical articles can function as the protective, transparent layer that covers the various recording media, such as high-density data storage using DVD, and more specifically, HDDVD, DVR, DVD-R and DVR+R, and DVD-RW and DVD+RW formats.

Display panel film is a key component of display panel devices. The material requirements for such a film includes good processibility, high molecular weight (e.g., an average molecular weight greater than about 5,000), and a glass transition temperature sufficient to withstand the heat generated during the display (e.g., generally greater than about 100° C.). The various embodiments of the polyestercarbonates and methods of preparing them provide a means to produce materials that meet and exceed these requirements of high molecular weight, high glass transition temperatures, and good processibility, thus making them useful to produce such films for the display devices. These films can be cast from solutions of the polyestercarbonates prepared using the methods described hereinabove. Such films produced from this and other techniques known in the art possess good processibility, outstanding dimensional stability, and a glass transition temperature sufficient to withstand the heat generated during the display.

Another aspect of the present disclosure is a method of making an article comprising molding a composition comprising the polyestercarbonates produced by the melt transesterification polymerization methods described above. In various embodiments, the polyestercarbonates for the molding composition comprise those in which the bisphenol comprises the bis(hydroxyaryl)cyclohexane described herein.

The molding step for making such articles can be performed by injection molding, thermoforming, blow molding, and the like.

The following examples are included to provide additional guidance to those skilled in the art in practicing the claimed disclosure. The examples provided are merely representative of the work that contributes to the teaching of the present application. Accordingly, these examples are not intended to limit the disclosure, as defined in the appended claims, in any manner.

EXAMPLES

Glass transition temperature of the polyestercarbonates was measured by differential scanning calorimetry by heating the sample at the rate of 10° C. to 20° C. per minute under nitrogen.

Weight average molecular weight ($M_w$) and number average molecular weight ($M_n$) were measured by gel permeation chromatography. Values quoted are relative to those measured for polystyrene standard.

Dimensional stability of the polyestercarbonate sample was measured by first casting a film from a solution of the polyestercarbonate in dichloromethane. The film was then placed in a chamber and subjected to a flow of nitrogen gas or nitrogen maintained at a relative humidity of 100% and 23° C. After a pre-determined length of time, generally about 30 to about 45 minutes, the film was exposed to a stream of dry nitrogen gas flowing at the rate of about 150 to about 200 ml/minute to remove all absorbed moisture from the film. The above process was repeated three times and the final length of the film was measured. The percent elongation (increase in length) of the film relative to the initial length was then calculated.

The catalyst composition in every example was prepared by taking appropriate aliquots of a stock solution of aqueous sodium hydroxide and 25 weight percent aqueous tetramethylammonium hydroxide. The catalyst solutions were freshly prepared once in 3–4 weeks.

General Procedure for Melt Transesterification Polymerization

A glass polymerization reactor was passivated by soaking it in a bath containing 1 molar aqueous hydrochloric acid solution. After 24 hours, the reactor was thoroughly rinsed with demineralized water, and finally with deionized water to ensure that all traces of acid and other contaminants were removed. The reactor was then thoroughly dried and charged with the appropriate amounts of the monomers comprising the bisphenol of formula (III), one or more aromatic dihydroxy compound comonomers, a dicarboxylic acid diester, and diphenyl carbonate. The reactor was then mounted in a polymerization assembly and checked to ensure that no leaks were present. The required amount of the catalyst solution, as prepared above, was then introduced into the reactor using a syringe. The atmosphere inside the reactor was then evacuated using a vacuum source and then purged with nitrogen. This cycle was repeated 3 times after which the contents of the reactor were heated to melt the monomer mixture. When the temperature of the mixture reached about 180° C., the stirrer in the reactor was turned on and adjusted to about 40 to about 80 rpm to ensure that the entire solid mass fully melted, a process that usually took about 15 to about 20 minutes. Next, the reaction mixture was heated to about 230° C. while the pressure inside the reactor was adjusted to about 170 millibar using a vacuum source. This temperature-pressure-time regime was designated as P1. After stirring the reaction mass at this conidition for about 1 hour, the reaction temperature was raised to about 270° C. while readjusting the pressure to about 20 millibar. After being maintained at this condition, designated as P2, for about 30 minutes, the temperature of the reaction mixture was raised to about 300° C. while bringing the pressure down to about 1.5 millibar. After allowing the reaction to proceed under these conditions, designated as P3, for about 30 to about 60 minutes, the pressure inside the reactor was brought to atmospheric pressure and the reactor was vented to relieve any excess pressure. Product isolation was accomplished by breaking the glass nipple at the bottom of the reactor and collecting the material. In the cases where the product was of a very high molecular weight, the hot molten polymer was dropped down by pressurizing the reactor with nitrogen gas.

Examples 1–2, Comparative Examples 1–3

The general polymerization procedure described above was used to prepare the polyestercarbonates. For each polyestercarbonate prepared, the glass transition temperature, molecular weight and swell data were measured using the general procedures described above. The results are shown below in Table 1. All reactions were carried out using a mole ratio of diphenyl carbonate to combination of X, aromatic dihydroxy compound comonomers, and dicarboxylic acid diester of 1.08. The catalyst used was mixture of sodium hydroxide and tetramethylammonium hydroxide taken in a mole ratio of 1:100, respectively. In each case, there was employed $2.5 \times 10^{-4}$ moles of tetramethylammonium hydroxide per mole of the combination of bisphenol and aromatic dihydroxy compound comonomer. Comparative Example 1 refers to BPA homopolycarbonate made using BPA and diphenyl carbonate using the general procedure described above. Comparative Example 2 refers to a polycarbonate copolymer prepared from an interfacial reaction of a 45:55 mole ratio of the monomers, 1,1-bis(4-hydroxyphenyl)-3,3,5-trimethylcyclohexane and 4,4'-(m-phenylenediisopropylidene) diphenol, respectively, with phosgene. Comparative Example 3 refers to a polycarbonate made using dimethylbisphenol cyclohexanone and diphenyl carbonate using the general procedure described above. The bisphenol composition in Table 1 refers to the combination of bisphenol and aromatic dihydroxy compound comonomer. The abbreviation DDDA-DDE refers to diphenyl dodecanedioate.

TABLE 1

| Example No. | Bisphenol composition (Name, Mole %) | Dicarboxylic acid diester (mole %) | $M_w$ (×10³) | $M_s$ (×10³) | $T_g$ (° C.) | % Swell |
|---|---|---|---|---|---|---|
| 1 | (I), 70 | DDDA-DPE, 30 | 31.6 | 11.8 | 106 | 0.034 |
| 2 | BPA, 10; (I), 70 | DDDA-DPE, 10 | 34.5 | 14.3 | 168 | 0.018 |
| Comparative Example 1 | BPA, 100 | Not used | 47.2 | 19.3 | 147 | 0.052 |
| Comparative Example 2 | — | — | Not measured | Not measured | Not measured | 0.024 |
| Comparative Example 3 | DMBPC, 100 | Not used | Not measured | Not measured | Not measured | 0.038 |

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims. All Patents cited herein are incorporated herein by reference.

What is claimed is:

1. A polyesterearbonate comprising structural units derived from:

at least one bisphenol of the formulas:

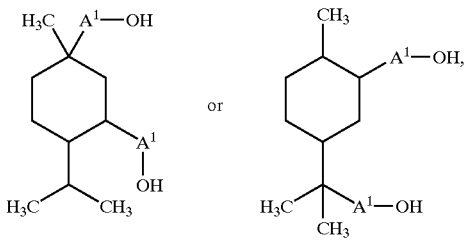

wherein each $A^1$ is independently a divalent substituted or unsubstituted aromatic radical;

at least one aromatic dihydroxy compound of the formula:

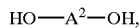

wherein $A^2$ is selected from divalent substituted and unsubstituted aromatic radicals;

at least one dicarboxylic acid diester of the formula:

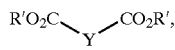

wherein Y is a $C_1$–$C_{40}$ linear or branched divalent hydrocarbyl radical, and R' is a $C_7$–$C_{12}$ aryl or alkaryl radical; and at least one carbonic acid diester of the formula $(ZO)_2$C=O, wherein each Z is independently an unsubstituted or substituted alkyl radical, or an unsubstituted or substituted aryl radical.

2. The polyestercabonate of claim 1 wherein the bisphenol is selected from the group consisting of of bisphenols having formulas:

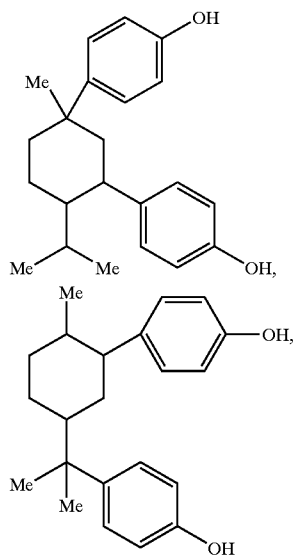

and combinations comprising at least one of the foregoing bisphenols.

3. The polyestercarbonate of claim 1 wherein the aromatic dihydroxy compound comprises at least one compound of the formula:

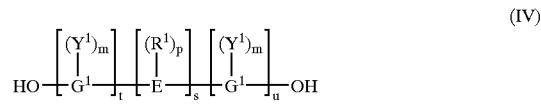

wherein $G^1$ is an aromatic group; wherein E is an alkylene, an alkylidene, a cycloaliphatic group; a sulfur-containing linkage, a phosphorus-containing linkage; an ether linkage, a carbonyl group, a tertiary nitrogen group, or a silicon-containing linkage, wherein $R^1$ is a hydrogen or a monovalent hydrocarbon group; wherein $Y^1$ is selected from the group consisting of a monovalent hydrocabon group, alkcnyl, ally), halogen, bromine, chlorine; nitro; wherein "m" represents any integer from and including zero through the number of positions on $G^1$ available for substitution; wherein "p" represents an integer from and including zero through the number of positions on E available for substitution; wherein "t" represents an integer equal to at least one; wherein "s" is either zero or one; and wherein "u" represents any integer including zero.

4. The polyestercarbonate of claim 1, wherein the aromatic dihydroxy compound is selected from the group consisting of 4,4'-(3,3,5-trimethylcyclohexylidene) diphenol, 4,4'-bis(3,5-dimethyl)diphenol, 1,1-bis(4-hydroxy-3-methylphenyl)cyclohexane, 4,4bis(4-hydroxypheuyl)heptane, 2,4'-diydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenylethane, 1,1-bis(4-hydroxy-2-chlorophenyl)ethane, 2,2-bis(4-hydroxyphenyl)propane, 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 2,2-bis(3,5,3',5'-tetrachloro4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 2,6-dihydroxy naphthalene; hydroquinone; resorcinol, $C_{1\text{-}3}$ alkyl-substituted resorcinols, 3-(4-hydroxyphenyl)-1,1,3-trimethylindan-5-ol, 1-hydroxyphenyl)-1,3,3-trimethylindan-5-ol, 2,2,2',2'-tetrahydro-3,3,3',3'-tetramethyl-1,1'-spirobi[1H-indene]-6,6'-diol, and combinations comprising at least one of the foregoing aromatic dihydroxy compounds.

5. The polyestercarbonate of claim 1, wherein Y of the dicarboxylic acid diester is a linear alkylidene group having the formula $(CH_2)_n$, wherein n has a value in the range from about 2 to about 18.

6. The polyestercarbonate of claim 1, wherein the carbonic acid diester is selected from the group consisting of diaryl carbonates, dialkyl carbonates, mixed aryl-alkyl carbonates, diphenyl carbonate, bis(2,4-dichlorophenyl) carbonate, bis(2,4,5-trichlorophenyl) carbonate, bis(2-cyanophenyl) carbonate, bis(o-nitrophenyl) carbonate, (o-carbomethoxyphenyl)carbonate; (o-carboethoxyphenyl) carbonate, ditolyl carbonate, m-cresyl carbonate, dinaphthyl carbonate, bis(diphenyl) carbonate, diethyl carbonate, dimethyl carbonate, dibutyl carbonate, dicyclohexyl carbonate, and combinations comprising at least one of the foregoing carbonic acid diesters.

7. The polyestercarbonate of claim 1, wherein the polycarbonate has a glass transition temperature of at least about 100° C.

8. The polyestercarbonate of claim 1, wherein the polycarbonate has a weight average molecular weight of at least about 5,000.

9. The polyestercarbonate of claim 1, wherein the polycarbonate has a dimensional stability as measured by percentage elongation of less than about 0.05% relative to its initial length following exposure to air with a relative humidity of about 100%, at a temperature of about 23° C., and for a duration of about 3 hours.

10. A polyestercarbonate comprising structural units derived from: at least one bisphenol of the formula

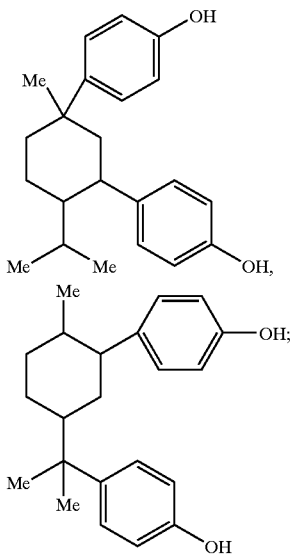

at least one aromatic dihydroxy compound comonomer selected from the group consisting of resorcinol, bisphenol A, 4,4'-(1-decylidene)-bisphenol, 2,2-bis(3-sec-butyl4-hydroxyphenyl)propane and mixtures thereof;

at least one dicarboxylic acid diester of the formula

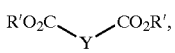

wherein Y is a linear divalent hydrocarbyl group of the formula $(CH_2)_n$, wherein n has values in the range from about 4 to about 18, and R' is phenyl; and diphenyl carbonate;

wherein the polyestercarbonate has a glass transition temperature of at least about 100° C.; a weight average molecular weight of at least about 5,000; and a dimensional stability as measured by percentage elongation of less than about 0.05% relative to its initial length following exposure to air with a relative humidity of about 100%, at a temperature of about 23° C., and for a duration of about 3 hours.

11. A melt transesterification polymerization method for producing a polyestercarbonate, the method comprising:

combining a catalyst and a reactant composition to from a reaction mixture; and mixing the reaction mixture under reactive conditions for a time period to produce a polyestercarbonate product, wherein the reactant composition comprises:

a carbonic acid diester of the formula $(ZO)_2C=O$, where each Z is independently an unsubstituted or substituted alkyl radical, or an unsubstituted or substituted aryl radical;

at least one bisphenol of the formula:

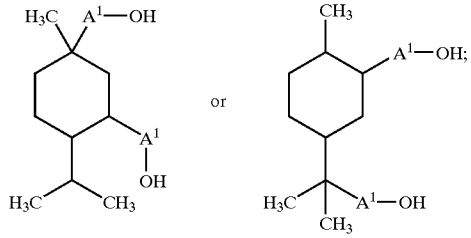

wherein each $A^1$ is independently a substituted or unsubstituted divalent aromatic radical;

at least one aromatic dihydroxy compound comonomer selected from the group consisting of

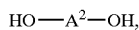

wherein $A^2$ is selected from divalent substituted or unsubstituted aromatic radicals; and at least one dicarboxylic acid diester selected from the group consisting of

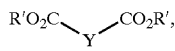

wherein Y is a $C_1$–$C_{40}$ linear or branched divalent hydrocarbyl radical, and R' is a $C_7$–$C_{12}$ aryl or alkaryl radical.

12. The method of claim 11, wherein the catalyst is selected from the group consisting of alkali metal compounds, alkaline earth metal compounds, tetraorganoammonium compounds, and tetraorganophosphonium compounds.

13. The method of claim 11, wherein the catalyst is an alkali metal compound of the formula $M_1X_1$, wherein $M_1$ is selected from the group consisting of lithium, sodium, and potassium; and $X_1$ is selected from the group consisting of hydroxide and OAr, wherein Ar is a monovalent aromatic radical.

14. The method of claim 11, wherein the catalyst is a tetraorganoammonium compound of the formula $R_4NY^2$, wherein R is a $C_1$–$C_4$ alkyl group, and $Y^2$ is hydroxide, acetate, or OAr, wherein Ar is a monovalent aromatic radical.

15. The method of claim 11, wherein the catalyst is a tetraorganophosphonium compound of the formula $R_4PY^2$, wherein R is a $C_1$–$C_4$ alkyl group, and $Y^2$ is hydroxide, acetate, or OAr, wherein Ar is a monovalent aromatic radical.

16. The method of claim 11, wherein the catalyst is a mixture of sodium hydroxide and tetramethylammonium hydroxide.

17. The method of claim 11, wherein the catalyst composition is $1 \times 10^{-7}$ to about $2 \times 10^{-3}$ moles for each mole of the mixture of the bisphenol, aromatic dihydroxy compound comonomer and dicarboxylic acid diester.

18. The method of claim 11, wherein the catalyst composition is $1 \times 10^{-6}$ to about $4 \times 10^{-4}$ moles for each mole of the bisphenol, aromatic dihydroxy compound comonomer and dicarboxylic acid diester.

19. The method of claim 11, wherein Z is selected from the group consisting of phenyl, 2,4-dichlorophenyl, 2,4,5- trichlorophenyl, 2-cyanophenyl, o-nitrophenyl, (2-methoxycarbonyl)phenyl; (2-ethoxycarbonyl)phenyl); tolyl, m-cresyl, naphthyl, ethyl carbonate, methyl, butyl, cyclohexyl, and combinations of two or more thereof.

20. The method of claim 11, wherein said bis (hydroxyaryl)cyclohexane is selected from the group consisting of:

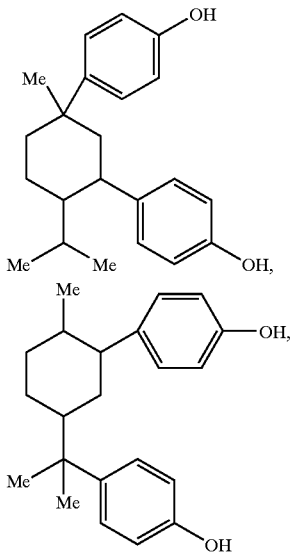

and combinations comprising at least one of the foregoing bis(hydroxyaryl)cyclohexane.

21. The method of claim 11, wherein Y of the dicarboxylic acid diester comprises a $C_2$–$C_{18}$ linear or branched divalent hydrocarbyl radical and R' is a phenyl radical.

22. The method of claim 11, wherein the reaction mixture is mixed at a temperature at about the melting temperature of the reaction mixture and about 350° C.

23. The method of claim 11, wherein the reaction mixture is mixed at a temperature about 180° C. to about 350° C.

24. The method of claim 11, wherein the reaction mixture is mixed at a temperature about 270° C. to about 350° C.

25. The method of claim 11, wherein the reaction mixture is mixed at a temperature about 300° C. to about 350° C.

26. The method of claim 11, wherein reaction mixture is mixed at a temperature that is stepwise raised from a first step of an initial value at about a melting temperature of the reaction mixture to about 180° C.; then to a second step of about 180° C. to about 230° C.; then to a third step of about 230° C. to about 270° C.; and then to a fourth step of about 270° C. to about 300° C.

27. The method of claim 11, wherein the reaction mixture is mixed at a pressure of about 0.01 mbar to about atmospheric pressure.

28. The method of claim 11, wherein the reaction mixture is mixed at a pressure of about 300 millibar to about 0.5 millibar.

29. The method of claim 11, wherein the reaction mixture is mixed by stirring for a time period of at least about one hour at a pressure in a range of about 0.01 mbar to about atmospheric pressure.

30. The method of claim 11, wherein the carbonic acid diester and the dicarboxylic acid diester are at a mole ratio of about 0.95 to about 1.30 relative to the total moles of bisphenol and aromatic dihydroxy compound comonomer in the reactant composition.

31. The method of claim 11, wherein the carbonic acid diester and the dicarboxylic acid diester are at a mole ratio of about 1.05 to about 1.15 relative to the total moles of bisphenol and aromatic dihydroxy compound comonomer in the reactant composition.

32. The method of claim 11, wherein the aromatic dihydroxy comonomer compound is selected from the group consisting of bisphenol A, resorcinol, 4,4'-(1-decylidene)-bisphenol, 2,2-bis(3-sec-butyl-4hydroxyphenyl)Propane, and combinations comprising at least one of the foregoing compounds.

33. The method of claim 11, wherein the polyestercarbonate product has a dimensional stability as measured by percentage elongation of less Elan about 0.05% relative to its initial length following exposure to air with a relative humidity of 100%, at a temperature of about 23° C., and for a duration of about 3 hours.

34. The method of claim 11, wherein the polyestercarbonate product has a weight average molecular weight of at least about 5000.

35. The method of claim 11, wherein the polyestercarbonate product has a glass transition temperature of at least about 100° C.

36. A method for producing a polyestercarbonate by a melt transesterification polymerization method comprising:
combining a catalyst comprising at least one of sodium hydroxide or tetramethylammonium hydroxide, and a reactant composition to form a reaction mixture; and mixing the reaction mixture under reactive conditions for a time period to produce a polyestercarbonate product, wherein the reactant composition comprises:
a diphenyl carbonate;
at least one bisphenol of the formulas:

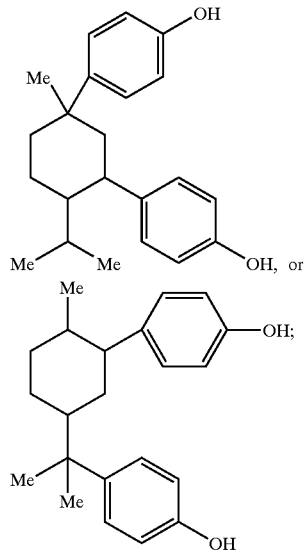

at least one aromatic dihydroxy compound comonomer selected from the group consisting of resorcinol, bisphenol A, 4,4'-(1-decylidene)-bisphenol, 2,2-bis(3-sec-butyl4-hydroxyphenyl) propane and mixtures thereof; and
at least one dicarboxylic acid diester selected from the group consisting of

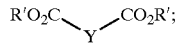

wherein Y is a linear divalent hydrocarbyl group of the formula $(CH_2)_n$, and wherein n has values in the range from about 4 to about 18, and R' is phenyl.

37. The method of claim 36, wherein the dicarboxylic acid diester is a diphenyl dodecanedioate compound.

38. The method of claim 36, further comprising heating the reaction mixture to a first temperature at an initial value in the range of between about the melting temperature of the reaction mixture to about 180° C.; then to a second temperature of about 180° C. to about 230° C., then to a third temperature of about 230° C. to about 270° C.; and then to fourth temperature of about 270° C. to about 300° C.

39. The method of claim 36, wherein the reaction mixture is at a pressure of about 0.01 mbar to about atmospheric pressure.

* * * * *